United States Patent [19]

Bonet

[11] 4,120,716

[45] Oct. 17, 1978

[54] METHOD OF APPLYING PRINTED LABELS TO FLEXIBLE ENVELOPES USING CORONA DISCHARGE TREATMENT

[75] Inventor: Robert André Bonet, Epernon, France

[73] Assignee: W. R. Grace & Co., Duncan, S.C.

[21] Appl. No.: 802,997

[22] Filed: Jun. 3, 1977

[30] Foreign Application Priority Data

Jun. 3, 1976 [GB] United Kingdom .............. 23042/76

[51] Int. Cl.[2] ........................ B29C 19/02; B32B 31/00

[52] U.S. Cl. .................................... 156/272; 156/277; 156/290

[58] Field of Search ................ 156/272, 380, 290, 277

[56] References Cited

U.S. PATENT DOCUMENTS

| | | | |
|---|---|---|---|
| T888,001 | 7/1971 | Drake | 156/272 |
| 2,237,346 | 4/1941 | Gilfillan | 156/290 |
| 2,773,285 | 12/1956 | Piazze et al. | 156/290 |
| 3,823,061 | 7/1974 | Frayer et al. | 156/272 |

*Primary Examiner*—Douglas J. Drummond
*Attorney, Agent, or Firm*—John J. Toney; William D. Lee, Jr.; John B. Hardaway

[57] ABSTRACT

Plastics bags are formed by welding a continuous tube or a pair of continuous films or a continuous folded film, and the finished bags are marked by attachment of pre-printed panels of plastics material using adhesion by corona-discharge irradiation of both the bag material and the printed panel material.

6 Claims, 7 Drawing Figures

METHOD OF APPLYING PRINTED LABELS TO FLEXIBLE ENVELOPES USING CORONA DISCHARGE TREATMENT

The present invention relates to an improved method of and apparatus for forming flexible envelopes, and to a flexible envelope so formed.

Traditionally flexible envelopes for packaging, for example food packaging, have been formed from superposed layers of thermoplastic film sealed in such a way as to define a flexible envelope.

In our U.S. Pat. No. 3,171,539 there is disclosed a method of laminating irradiated biaxially stretched polyethylene film by corona discharge treatment of the faces to be brought into contact, and then contacting those faces after which they adhere together permanently.

In French published patent specification No. 2,269,411 there is also disclosure of placing two corona discharge-treated surfaces, with the application of heat, to bond the surfaces together.

In the past it has been desirable for a finished plastic bag to bear printed markings such as advertising material or a description of the contents. Thus the conventional bags may be printed after manufacture, or alternatively they may be formed from a stock of thermoplastic film material which has already been printed before conversion into the envelope.

With either of these prior art methods it has been necessary for a considerable stock of thermoplastic film to have been printed with indicia which may be pertinent only to one particular type of envelope or to envelopes for one particular customer and it is an object of the present invention to facilitate a reduction in the quantity of film material committed to one particular marking style.

One aspect of the present invention provides a method of manufacturing flexible envelopes comprising taking a first thermoplastic film material and sealing it so as to construct a flexible envelope, taking a second sheet of thermoplastic film printed with indicia which are eventually to be borne by the finished envelope, subjecting a face of the printed film material and a portion of the first film material which will define one face or part of one face of the finished envelope to a corona discharge treatment, and bringing the treated face of the printed film material into contact with the treated part of the said first film material to bond the printed material to the said first film material either before, during or after formation of the flexible envelope.

Preferably, the said first film material consists of an endless tube of flexible film folded flat and having the said treated portion on one of the outwardly facing surfaces of the flat film, and the printed film is placed in contact therewith before transverse sealing of the flat film at regular intervals to define rectangular envelopes and severing of the envelopes one from another. Alternatively, the contacting of the printed film material with the said first film material may take place immediately after corona discharge treatment of the respective surfaces and just as the first film material is extruded, or the contacting may take place after the individual envelopes had been formed and severed one from another.

Advantageously the printed film material may be printed in the form of a web having multiple printed panels extending across it and the web then slit to form several parallel rows of printed panels each panel being intended for a respective envelope.

The printed material may be subjected to corona discharge treatment and brought into contact with the said first film material immediately after printing or the corona discharge step may take place after printing but before the material is coiled onto a roll to be stored ready for bringing into contact with the corona discharge-treated part of the said first film material, or the printed film material may, after printing, be stored on a roll and then subsequently unwound and subjected firstly to the corona discharge treatment and secondly contacted with the said first film.

Another aspect of the present invention provides apparatus for forming flexible envelopes comprising means for feeding at least one web of a first thermoplastics film towards a sealing station, means at the sealing station for sealing the said at least one web to form a plurality of flexible envelopes and for severing them one from another, means for subjecting at least one face of the said at least one web to a corona discharge treatment, means for feeding a second web of thermoplastic film concurrently with said at least one first web, means along the path of movement of said second web for subjecting said second web to a corona discharge treatment on one face thereof, and guide means for bringing said second web with its corona discharge treated face into contact with the corona discharge treated face of said at least one first web.

The present invention also provides a flexible envelope formed by the above method or using the above apparatus.

Preferably, the film material for both the bag and the label is polyethylene and the step of contacting the two materials is carried out without generalised application of heat.

Using the envelope manufacturing process of the present invention it is possible to manufacture the envelope from a stock of unprinted film, advantageously flat tubular film, and to hold minimum stocks of printed film for bonding thereto, by ensuring that the size of the printed film material is much less than the size of the face of the bag material to which the printed film is to adhere.

Costs can also be kept down by virtue of the fact that it is now possible to print several rows of panels simultaneously in an array extending laterally across a continuous web of the second film material and to slit the rows one from another after printing. Preferably, this slitting takes place after the web material has also been subjected to a corona discharge treatment on one face.

In order that the present invention may more readily be understood, the following description is given merely by way of example and with reference to the accompanying drawing in which.

Figure 1:
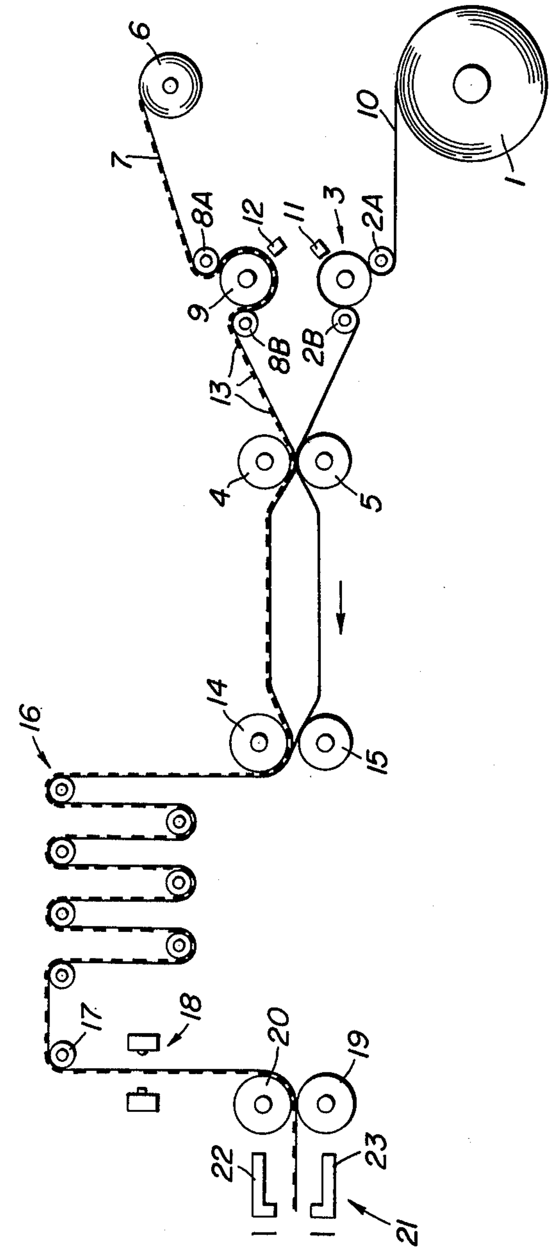
FIG. 1 is a side elevational, partly schematic view of a bag-making apparatus using a supply of printed polyethylene film for the labelling panels.
Figure 4:
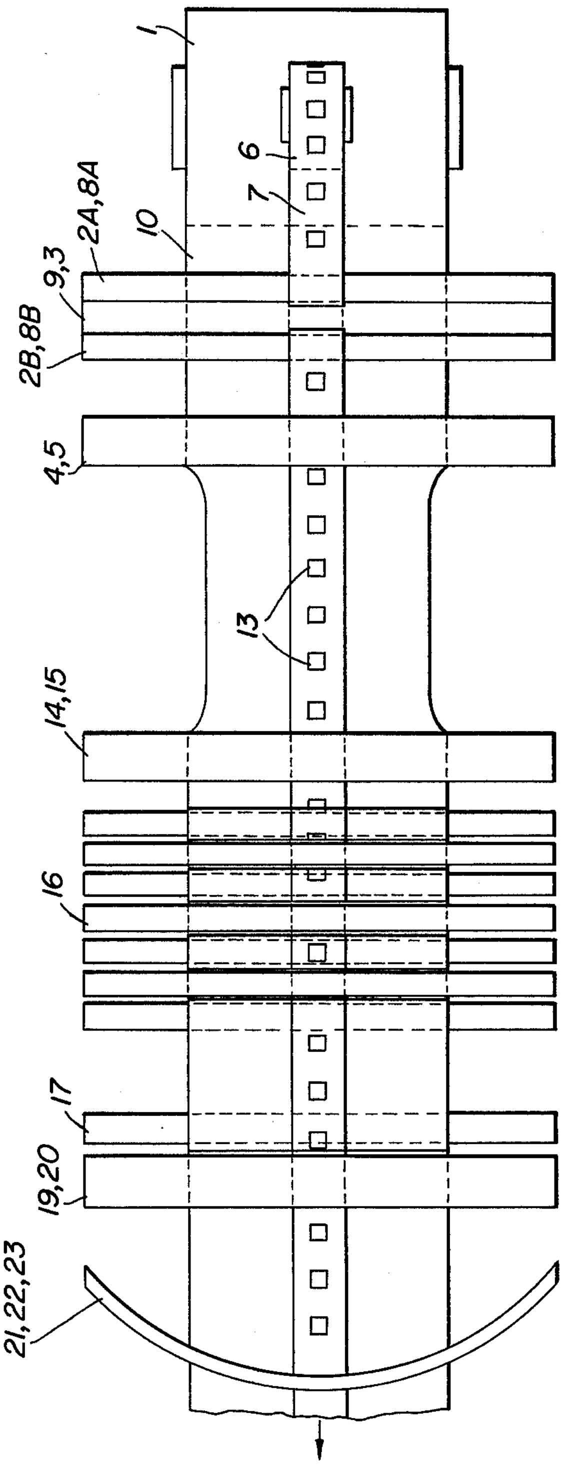
FIG. 4 is a top plan view of the apparatus of FIG. 1.
Figure 5A:
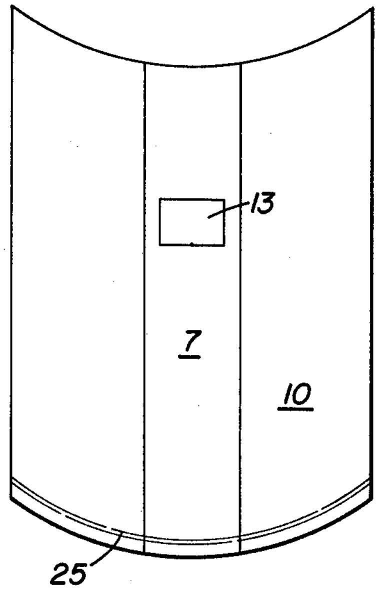

FIGS. 5*a,* 5*b* and 5*c* are top plan view of three different forms of finished bag made on the apparatus of FIGS. 1 and 4.

Referring now to the drawings, and in particular to FIGS. 1 and 4, it will be seen that a supply roll 1 of extruded flat tubing, in this case the tubing marketed by W. R. Grace & Co. under the Registered Trade Mark "Cryovac BB1" for bag formation, supplies a continuous tubular web for passage over a first guide roll 2A, round a corona treatment roll 3 and then round a second guide roll 2B for further advance to a first nip between a pair of pinch rolls 4, 5.

Similarly, a supply roll 6 of printed film of the type marketed by W. R. Grace & Co., under the Registered Trade Mark "D film" feeds a web of film material 7 over a first guide roll 8A and round a corona treatment roll 9 and then by way of a second guide roll 8B to the same pinch rolls 4, 5 as the "Cryovac BB1" tubing 10.

A corona unit 11 is illustrated schematically at a location close to the periphery of the corona discharge roll 3 for the "Cryovac BB1" tubing 10, and a further similar corona unit 12 is illustrated schematically close to the periphery of the roll 9 for the printed film 7.

In the Figure the printed indicia on the film 7 are illustrated schematically at 13.

Clearly, the lower face of the printed film 7 is the one which is subjected to the corona discharge effect from corona unit 12, and the upper face of the flat tubing 10 is the face which is subjected to the corona discharge effect of the corona unit 11. These two faces are the ones which are brought into contact at the nip between the pinch rolls 4 and 5.

From the pinch rolls 4 and 5, the two superposed materials, namely the printed web 7 and the flat tubing 10 pass to a second pair of pinch rolls 14, 15 from which they enter an inventory roller assembly 16 of which the rollers are relatively movable in the vertical direction for ensuring that there will always be a supply of the laminated tubing available for advancing to the bag-forming station, even though there may be a temporary hold-up in the feed of either the tubing from roll 1 or the film from roll 6, in the event of depletion of a supply roll of either of these materials and replacement by a fresh supply roll.

From a final guide roll 17 at the end of the inventory assembly the laminated film material passes a photoelectric detector cell-source pair 18 to indicate the repeat length of the bag material and is then guided through a pair of final pinch rolls 19, 20 before advancing to the sealing station 21 where relative closing together of the upper and lower sealing jaws 22 and 23, respectively, is effective to form a transverse seal line across the tubular material and to sever a bag thus formed from the next adjacent bag along the line of the tubing.

The sealing jaws 22, 23 may either by arranged so that the leading edge of the tubular material is open to define the mouth of the bag just being formed (i.e., the bag has its mouth at the left-hand side as viewed in FIG. 1) in which case the sealing jaws 22, 23 will make an L-seal to bond the opposite edge of that same bag and separate that bag from the open end of the next successive bag, or alternatively the jaws 22, 23 may be arranged to form a transverse seal along a first line across the extreme leading edge of the tubing and to sever the opposite edge of the thus formed bag along a second line across the tubing so as to define at said second line, upstream of the first open mouth of the bag thus formed and the closed end of the next successive bag (i.e., the mouth of the bag is at the right-hand side as viewed in FIG. 1).

Although in FIG. 1, the supply of printed film remains continuous even after bonding to tubing 10 and the severing of both the printed film and the tubing takes place at the sealing jaws 22, 23, it would alternatively be possible to incorporate means for severing the supply of printed film material just at the nip between the pinch rolls 4 and 5 to form discreet rectangular labels which could be secured in spaced relationship along the length of the flat tubing 10 so that the absolute minimum of printed material is necessary in each of the bags thus formed.

Figure 2:
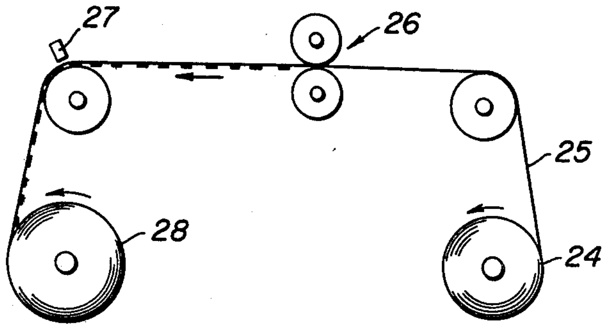
FIG. 2 is a schematic side elevational view showing apparatus for manufacturing and rolling up printed film which has already been subjected to a corona discharge step.

FIG. 2 shows schematically a device for manufacturing the printed film material 7 in pre-treated form.

A supply roll 24 of polyethylene, marketed by W. R. Grace & Co., under the Registered Trade Mark "D film" is arranged to supply a web 25 of the film past the printing station 26 and then, by way of a discharge corona 27 to take up roll 28 where the pre-treated and printed film is wound up.

The supply roll 28 thus formed can, if desired, be used for supplying, directly to the nip between pinch rolls, such as rolls 4 and 5 of FIG. 1, film which is already corona-treated and printed. In this case there will be no need for intervening corona discharge treatment, provided the supply roll 28 is connected up so that it is the lower face of the film at the nip 4,5 which was corona-treated before winding up onto roll 28 in the apparatus of FIG. 2.

Figure 3:
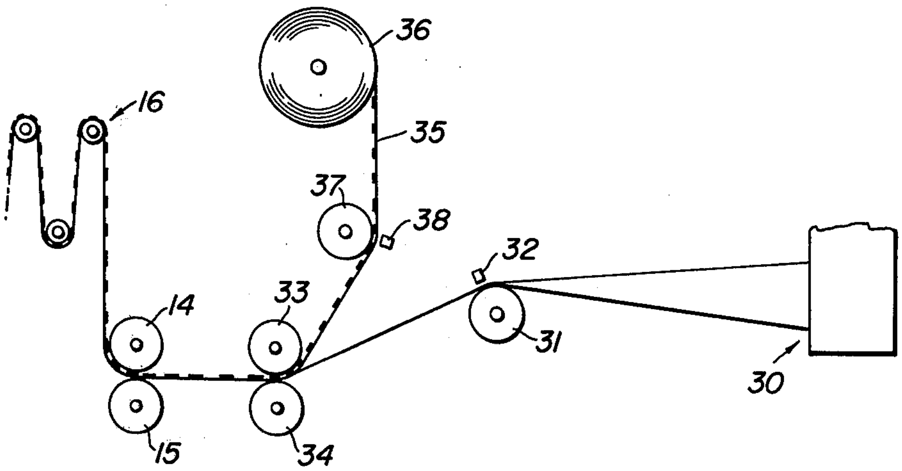
FIG. 3 is a side elevational, partly schematic, view showing an alternative form of the apparatus in which the printed web is secured to the extruded tubing at the extrusion rewind station to provide a wound roll of printed tubing for subsequent bag making.

FIG. 3 illustrates an alternative arrangement in which the thermoplastic tubing 10 is extruded from a tubular die 30 and is then folded flat as it passes over a guide roll 31 the circumference of which passes close to a corona unit 32. This film is then immediately passed to the nip between a pair of pinch rolls 33, 34 at which the film meets a pre-printed web 35 of the aforementioned "D film" which has been advanced in pre-printed film from a supply roll 36 and over a guide roll 37 where it is subjected to corona discharge treatment by means of a corona unit 38 on that face which is to contact the flat tubular film from the roll 31.

It will be appreciated from the above description that the width of the printed web is preferably considerably less than the width of the flat tubing and that the length of the print repeat on the printed web may also preferably be much less than the bag repeat length of the flat tubing, for example by using the above mentioned means for severing the individual label panels at the nip 4,5 where they become bonded to the flat tubular film. For best economy of the printed film material the area of the printing will be substantially the total area of the label panel so that little or no unprinted plastics material will be present around each label zone.

Figure 5B:
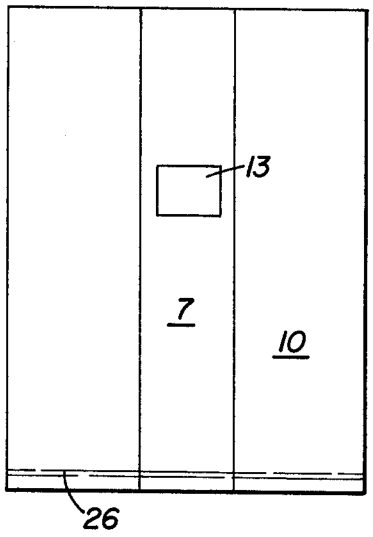
Figure 5C:
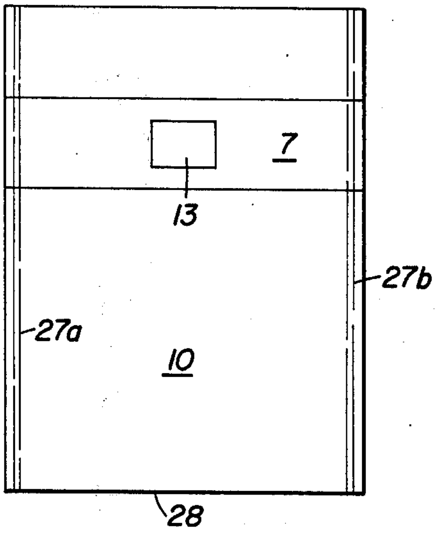

Instead of the flat-folded tubing 10 illustrated in FIG. 1, it is possible to form the envelope in the present invention using either two separate but superposed webs sealed along three intersecting seal lines in any suitable configuration to form envelopes, or to use a center-folded film such that the bottom of the finished envelope is formed by the fold and the other side edges are closed by transverse seals as shown in FIG. 5*c*.

The step of inflating the tubular web of bag material 10 between pinch rolls 4, 5 and the subsequent pinch rolls 14, 15 is in order to improve the openability of finished bag and is carried out after the web 7 with its printed label panels 13 has been bonded to the tubular web 10 by mere application thereto with the corona discharge treated faces in contact.

FIG. 5*a* shows one particularly convenient form of the finished bag in which the seal line 25 is of arcuate form extending transversely across the web 10 so that, at the mouth end of the bag, the bag edge is concave and at the bottom end of the bag adjacent the seal line 25 the bag is convex. This particular form of bag is convenient for use in an automatic bag loader using a pneumatic bag-opening step and the bags may advantageously be formed into an imbricated package.

The bag shown in FIG. 5*b* is formed in the same way as the bag of 5*a* but as a truly rectangular configuration in that the seal line 26 at the bottom of the bag is rectilinear and extends transversely across the web 10.

One example of a side-sealed bag is shown in FIG. 5*c* where the label-bearing web 7 has been applied to the bag-forming web 10 which in this case is a center-folded film having a fold-line 28. Rectilinear transverse seal lines 27*a* and 27*b* form the side edges of the bag leaving a truly rectangular bag with the open end of the bag formed by the superposed free lateral edges of the center-folded film 10.

I claim:

1. A method of applying printed labels to flexible envelopes comprising (a) providing a first flattened tubular thermoplastic film material and sealing it transversely at periodic intervals and then severing the sealed tubing at periodic intervals so as to construct a flexible envelope having a sealed bottom and open top, (b) forming printed labels by printing a series of repetitive indicia on a second sheet of thermoplastic film the width of each of said indicia being less than the width of one side of said flattened tubing, (c) subjecting a face of the printed labels and at least a portion of the first film material having the same dimensions as said labels to a corona discharge treatment, and (d) bringing the treated face of the printed labels into contact with the treated part of the said first film material to bond the printed labels to the said first film material either before, during or after formation of the flexible envelope, and wherein the step of bringing into contact is carried out without generalized application of heat.

2. A method according to claim 1, wherein the printed label is placed in contact therewith before transverse sealing of the flat film at regular intervals to define rectangular envelopes and severing of the thus formed envelopes one from another.

3. A method according to claim 1, wherein said contacting of the first film material and the treated face of said printed labels takes place after the individual envelopes have been formed and severed one from another, each of said printed labels having dimensions less than those of the face of the finished envelope.

4. A method according to claim 1, wherein said printed labels are printed in the form of a web having multiple printed panels extending across it and the web is then slit to form several parallel rows of printed panels prior to bonding to the first film material, each panel being intended for a respective envelope.

5. A method according to claim 4, wherein the slitting takes place after the web material has also been subjected to a corona discharge treatment on one face.

6. A method according to claim 1, comprising the steps of firstly printing said printed film material; secondly storing it on a roll; and then thirdly, later unwinding the printed film from the roll and subjecting it to the corona discharge treatment before contacting it with said first film.

* * * * *